United States Patent [19]
Tucker et al.

[11] 3,811,706
[45] May 21, 1974

[54] TRAILER HITCH

[75] Inventors: Raymon Z. Tucker, Elkhart, Ind.; Jack O. Benson, Union, Mich.

[73] Assignee: Schott Industries, Inc., Cincinnati, Ohio

[22] Filed: Jan. 2, 1973

[21] Appl. No.: 320,605

[52] U.S. Cl............. 280/407, 280/423 R, 280/434, 280/490, 280/477, 280/508
[51] Int. Cl............................................. B62d 53/12
[58] Field of Search........ 280/423 R, 434, 477, 490, 280/508, 407

[56] References Cited
UNITED STATES PATENTS

| | | | |
|---|---|---|---|
| 1,986,149 | 1/1935 | Harris | 280/433 |
| 2,481,461 | 9/1949 | Wolfrum | 280/508 |
| 2,726,878 | 12/1955 | Fontaine | 280/434 |
| 3,022,091 | 2/1962 | Braunberger | 280/434 |
| 3,164,399 | 1/1965 | Lugash | 280/433 R |
| 3,392,992 | 7/1968 | Baker | 280/423 R |
| 3,578,357 | 5/1971 | Bouman | 280/434 |

FOREIGN PATENTS OR APPLICATIONS

| | | | |
|---|---|---|---|
| 1,450,344 | 7/1966 | France | 280/434 |

Primary Examiner—Leo Friaglia
Attorney, Agent, or Firm—William D. Stokes

[57] ABSTRACT

A hitch apparatus for securing a trailer to a towing vehicle. In particular a hitch is provided which is useful for securing trailers of the type known as "Fifth Wheel" trailers to a pick-up truck and includes a pair of outrigger supports secured to the truck bed and extending over the rear wheel wells, and a removable crossmember which is mountable at a plurality of points on the outrigger supports to insure placement of the crossmember for maximum support with respect to the rear axle. The hitch further comprises a locking mechanism mounted on the crossmember which automatically engages the mating element upon contact. The hitch apparatus achieves further stability by having a mating element which may be adjustably extended from the towed vehicle. The hitch is provided with a self-locking feature and means for securing the lock in a locked or unlocked position.

14 Claims, 10 Drawing Figures

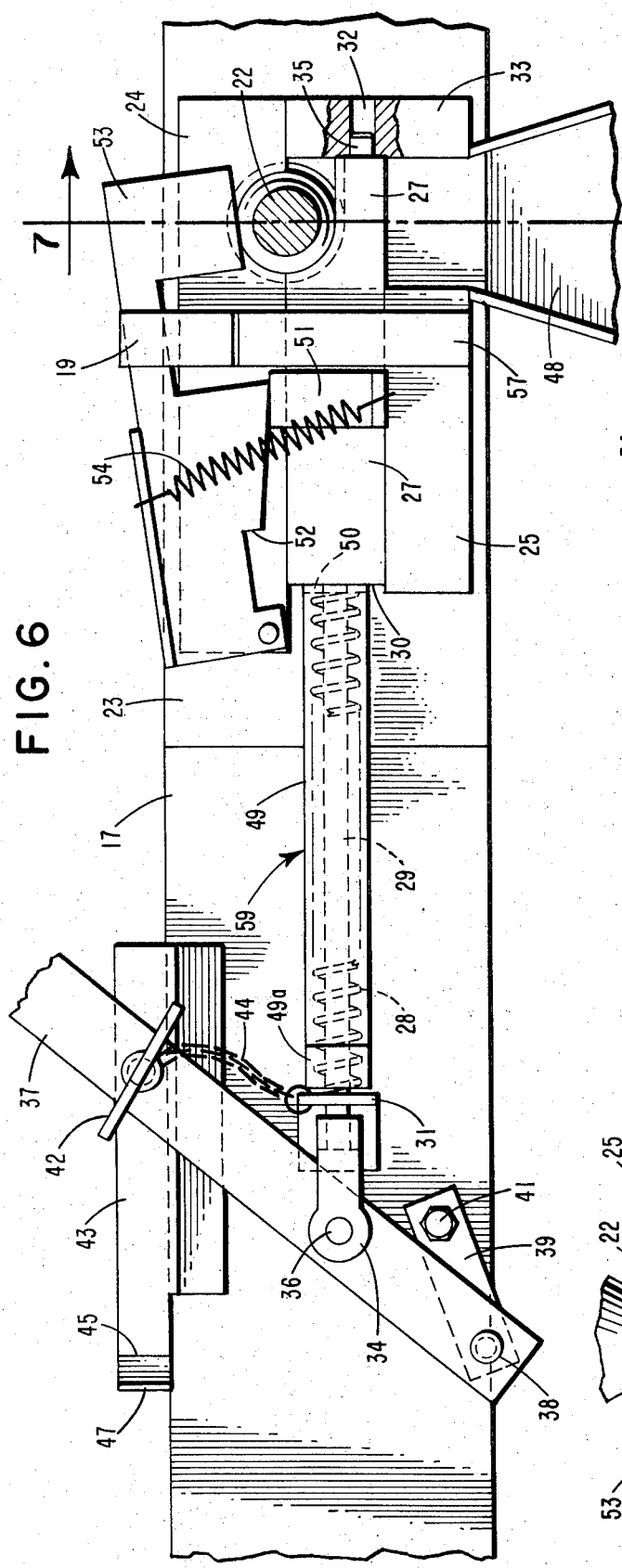
FIG. 6
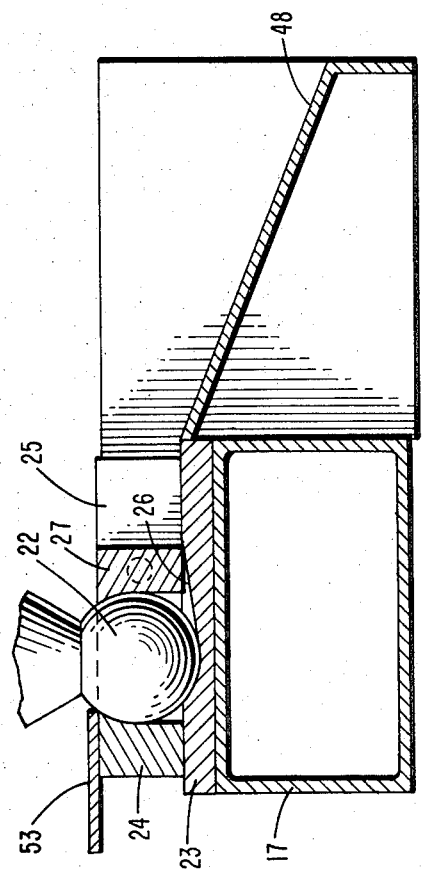
FIG. 8
FIG. 7

TRAILER HITCH

BACKGROUND OF THE INVENTION

With the growing popularity of camping and recreational activities, a number of hitching devices have been introduced which are particularly suited for use with various types of towing vehicles. Of all the motor vehicles commonly owned for personal use, perhaps the one most suited as a trailer towing vehicle is the pick-up truck. This is true because of its relatively heavy-duty construction as compared with the family-type automobile. Moreover, the pick-up truck readily lends itself to pulling trailers which are designed in such manner as to extend over the towing vehicle. A specific type of travel trailer that extends over the towing vehicle is called a "fifth wheel" trailer. Various types of hitches for such trailers have long been used; however the known type "fifth wheel" hitches are relatively complex, difficult to couple and relatively expensive. Moreover, the known devices were primarily designed for commercial type cargo trailers which cannot be mounted in the bed of a pick-up truck. The known hitches for travel trailers usually require permanent structures mounted between the rear wheel wells, rendering the pick-up truck substantially useless as a cargo carrier when not pulling a trailer. With the increase in popularity of using a pick-up truck towing vehicle for recreational vehicle-type trailers a great need has arisen for a safe, easy to operate automatically coupling hitch which, when not in use, will not interfere with the normal cargo carrying capacity of the pick-up truck.

OBJECTS OF THE INVENTION

It is a primary object of this invention to provide a simple, practical, easy to operate recreational trailer hitch that enables a trailer being towed to be substantially level with the road at all times.

Consistent with this primary object, it is a further object hereof to provide a trailer hitch enabling the operator of a towing vehicle to achieve full and safe braking capacity for both the towing vehicle and the trailer.

Still another most important object of this invention is to provide a trailer hitch facilitating the use of a particular trailer with towing vehicles having different truck bed heights and spring capacities.

A further object of this invention is the provision of a means for detachably connecting the hitch outrigger supports to the wheel well for stability.

A still further object of this invention is the provision of a hitch which permits efficient use of space in the back of a pick-up truck and allows placement of the load directly above the rear axle or, as the case may be, ahead of the rear axle for more efficient towing.

Another principal object of the invention is the provision of an automatic locking mechanism which prevents the trailer from becoming uncoupled during operation even under the most extreme conditions of towing.

Still another important object is the provision of a trailer hitch, having a trigger mechanism for automatically connecting the trailer connecting pin or ball to the hitch upon contact with the ball or pin socket.

BRIEF SUMMARY OF THE INVENTION

The apparatus of the invention comprises an adjustable pin means for mounting on the vehicle to be towed and a hitch means for mounting on the towing vehicle comprising (a) means defining a seat; (b) locking means for locking the pin in the seat means wherein the locking means is capable of assuming both a locked position and unlocked position; (c) a spring means urging the locking means into a locked position; and (d) a trigger means, including cocking means for holding the hitch open when the locking means is in a position to receive the trailer pin and triggering the automatic locking of the pin in the seat upon contact of the pin with the trigger.

In accordance with an embodiment of the invention, a hitching apparatus is provided which may be readily installed in the bed of a pick-up truck which comprises means mounted over the wheel wells in the bed of the truck to which is mounted and adjustably and detachably mounted cross support member on which the hitch means is installed.

The invention will be better understood and objects other than those set forth above will become apparent, when consideration is given to the following detailed description. Such description makes reference to the annexed drawings presenting preferred illustrative embodiments of the invention, in which like parts have the same numerals and wherein:

FIG. 6 is a fragmentary top plan view partially in section of the locking mechanism of the present invention in the locked position;

FIG. 7 is a sectional view along the line 7—7 of FIG. 6;

FIG. 8 is a sectional view along the line 8—8 of FIG. 5;

FIG. 9 is a sectional view along the line 9—9 of FIG. 5; and

DETAILED DESCRIPTION OF THE INVENTION

Figure 1:
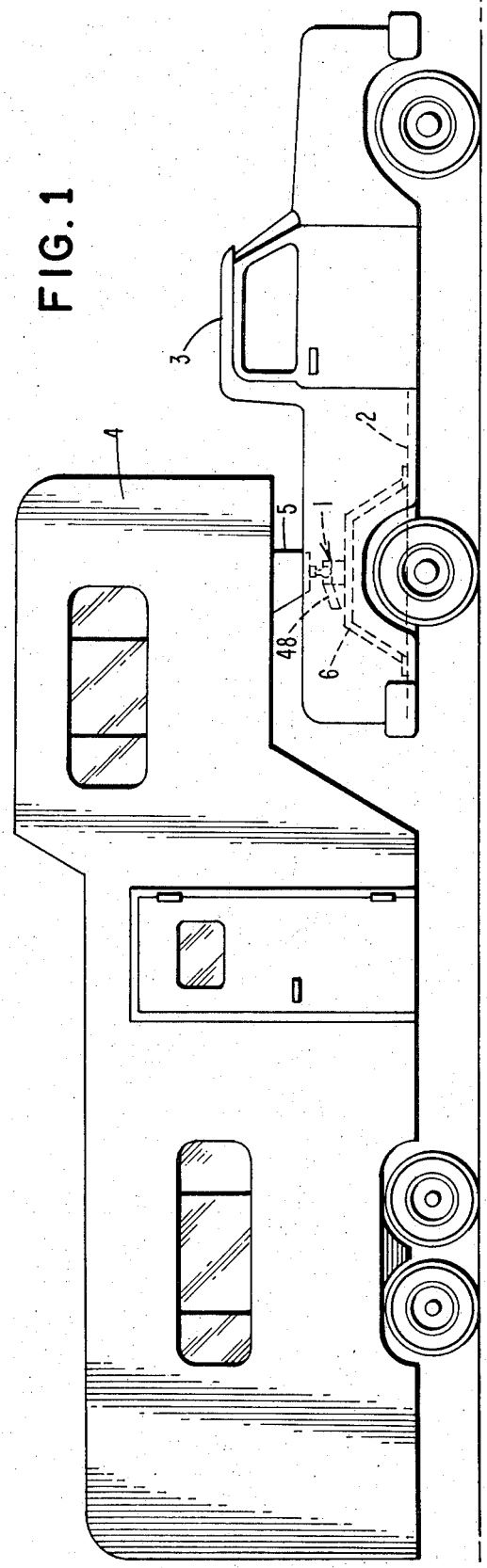
FIG. 1 illustrates a pick-up truck towing a vehicle with the hitch of the present invention secured to the bed of the pick-up truck.
Figure 5:
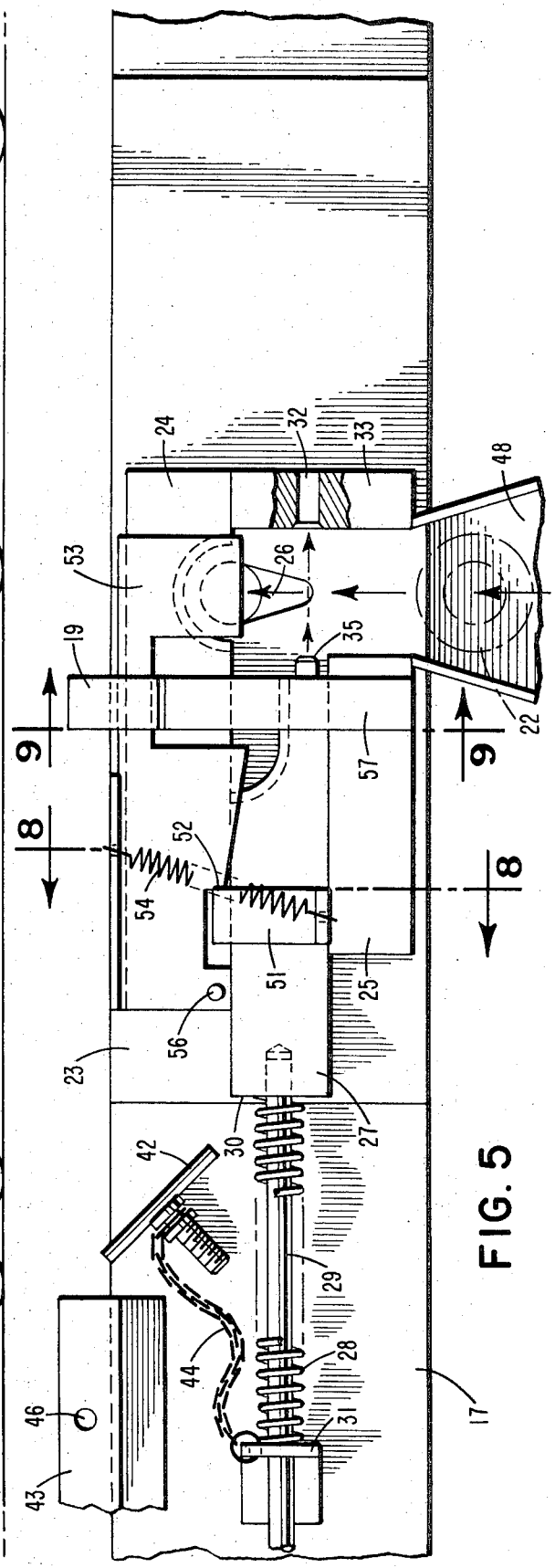
FIG. 5 is a fragmentary top plan view partly in section of the pin locking mechanism of the present invention in the unlocked position.

FIG. 1 illustrates the hitch member 1 of the present invention mounted on the bed 2 of a pick-up truck 3 shown connected with the pin box assembly 5 of the invention mounted on a trailer 4. The trailer illustrated is the type referred to in the industry as a "fifth Wheel" trailer. As illustrated in greater detail in FIGS. 2, 3, and 4, the hitch of the invention is provided with a pair of outrigger support members 6, each support member being mounted over the rear wheel wells 7 of the pick-up truck and secured to the truckbed 2. The outrigger supports may be additionally secured to the towing vehicle by means of, for example, a pair of reinforcing plates 9 mounted beneath the truckbed by bolts 11. In the preferred mounting of the invention, and for towing heavier loads, wheel well brackets 13 are provided. When utilized, brackets 13 are mounted, for example, by welding to outrigger supports 6 and mounted on wheel wells 7 by bolt means 14. Where desired, additional strength for heavier loads can be achieved by substituting rigid frame members (not shown) for plates 9. Such structural frame members are mounted transversely with respect to the truckbed and are secured to the chassis 8 of the truck. Supports 6 may be secured in an alternate inboard location as shown by dot-dash lines in FIG. 4 to fit various truck designs; however, in the preferred embodiment, the supports are mounted over the wheel wells for maximum utilization of the cargo capacity of the pick-up truck.

A cross-member support 17 is secured at its ends to outrigger supports 6. While outriggers and cross-member 17 may be fabricated as an integral unit, in the preferred embodiment, cross-member support 17 is a separate and detachable element member. In the illustrated embodiment cross-member 17 is shown detachably mounted on outriggers 6 by bolt means 18. A plurality of openings 21 for insertion of the bolt means 18 are provided on the outriggers 6 for adjustably securing the cross-member 17 thereto in the most advantageous position with respect to the rear axle of the truck. By way of example, cross-member 17 may be mounted directly above the rear axle of the truck in order for the weight of the trailer to be distributed directly upon the axle or, at other points when recommended by the vehicle manufacturer. As illustrated, particularly in FIG. 7, the trailer pin 22 of the invention fits into a seat in the lock assembly on cross-member support 17. The socket or seat of the hitch is defined by a seat plate 23 mounted on cross-member support 17 and a stationary ball, or pin, receiving jaw means 24 mounted on said seat plate member.

Figure 2:
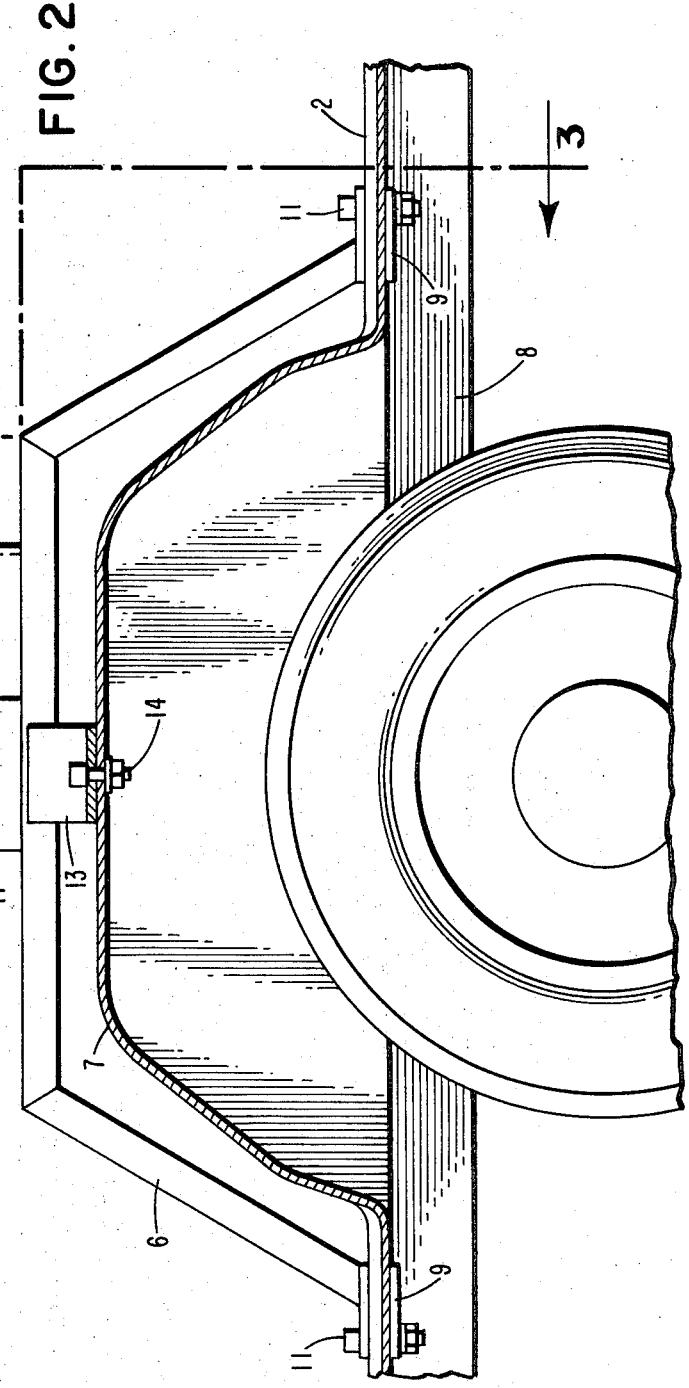
FIG. 2 is a side view partly in section of the hitch apparatus of the present invention showing alignment of trailer pin member with respect to the locking member prior to engagement.

An adjustable pin or ball box assembly 5 is provided as illustrated in FIG. 2. Pin box assembly 5 is provided with a frame or box member 12 adapted to be mounted on the trailer or towed vehicle. A sleeve member 15 is vertically disposed through, and internally connected, as by welding, to the bottom plate member 16 of box member 12. Shaft member 19 is telescopingly mounted within sleeve member 15. The hitch ball or pin member 22 is integrally mounted on the free downwardly exteriorly extending end of telescoping shaft 19. Telescoping member 19 is provided with a plurality of oppositely disposed pairs of holes 20, each pair of which line up with a pair of locking pin or key receiving holes in the exteriorly and downwardly extending portion of sleeve 15. The vertical adjustability of pin 22 provides for the horizontal leveling of the trailer and thus equalization of traction on both sets of the tandem wheel trailer support as seen in FIG. 1. In FIG. 2, adjustable shaft 19 is shown lockingly engaged by bolt means 10.

Seat plate 23 is contoured to form the seat 26 for receiving and seating pin 22. In operation pin 22 is restrained from leaving the seat by a jaw member 27. A downwardly and outwardly extending loading ramp 48 mounted on seat plate 23 is provided for guiding the pin member 22 into seating engagement with the locking means.

Referring particularly to FIGS. 3, 4, 5, and 7 it may be seen that jaw member 27 is slidably mounted in a channel formed by the seat plate 23, the inner wall of fixed jaw member 24, a flange member 25 mounted on seat plate 23 and retainer bar 57. Retainer bar 57 is secured to the upper surfaces of flange 25 and stationary jaw member 24. Flange end 19 of retaining bar 57 is constructed in such manner as to overlie and retain trigger plate 53, described in detail hereinafter.

Means for opening and closing sliding jaw member 27 comprise a shaft or rod element 29 integrally connected at one end to the chin portion 30 of jaw member 27 and journaled through a spring retainer means 31 mounted on cross-member 17, and connected at its other end through connecting link 34 to handle 37.

A compression spring 28 is disposed around slidable shaft 29 and tensioned between spring retainer 31 and chin portion 30 of locking jaw member 27 to the end that jaw member 27 is urged into the closed or locking position. The pin locking or mouth portion of slidable jaw member 27 terminates in lock bolt element 35. When in the fully locked position, lock bolt 35 mates with bolt hole 32 in a striking plate 33 mounted on seat plate 23, thus insuring proper alignment and engagement of locking jaw member 27. When the sliding jaw is in the locked position, it, in conjunction with fixed jaw 24, encloses substantially 300° of the circumference of ball 22, as best seen in FIG. 6. In addition, as best seen in FIGS. 7 and 9, the locking surfaces of jaw member 24 and 27 are constructed in such manner as to closely conform to the surface of locking pin 22.

A trigger mechanism is provided to hold open and effect automatic locking of sliding jaw 27 around the pin 22 upon insertion of the pin member into the receiving portion of the seat 26. The triggering mechanism of the invention comprises a trigger plate 53 pivotally mounted on the upper surface of fixed jaw member 24 by pressed pin 56, and in rotatably sliding relation therewith. Trigger plate 53 extends partially over the pin seat 26 when in the cocked position. Mounted on sliding jaw 27 is a latch bar 51 adapted to engage with a detent catch 52 on trigger plate 53. Latch bar 51 automatically engages with detent catch 52 in the trigger edge of plate 53 when sliding locking jaw 27 is slid into the fully open or unlocked position. The trigger edge of trigger plate 53 is formed in such manner as not to impede movement of jaw member 27 to the closed position when the trigger latch is released. In the illustrated embodiment the plate is shown as being outwardly angled from detent catch 52 to facilitate unlatching of latch bar 51. A tension spring 54, mounted at one end of trigger plate 53 and at its other end to sliding jaw member 27, preferably on latch bar 51, is provided to bias and hold the trigger in the cocked position.

Shaft 29, journaled through spring retainer 31 is pivotally secured at its journaled end to connecting link 34 and rotatingly linked by a clevis 36 to handle 37. Movement of handle 37 to the right or left imparts a reciprocating motion to shaft 29 and in turn sliding jaw 27. Handle 37 is connected to cross-member 17 by a linking assembly comprising plate 39 and pins 38 and 41. A friction brake 47 is provided to restrain handle 37 from movement toward the lock position after opening the hitch. Brake 47 comprises a brake plate 43 mounted on crossmember 17, having a bend 45 on the end thereof to form the friction brake 47. A handle locking screw pin 42 is provided to be inserted through a hole 37' in the handle 37 and into locking engagement with brake plate 43 by screwing into threaded hole 46 in brake plate 43. Screw lock 42, when engaged through handle 37 with threaded hole 46 will prevent movement of handle 37 to the left thus insuring that jaw member 27 cannot be opened. Threaded pin 42 is shown secured by chain 44 to bracket 31 to prevent loss thereof.

Figure 10:
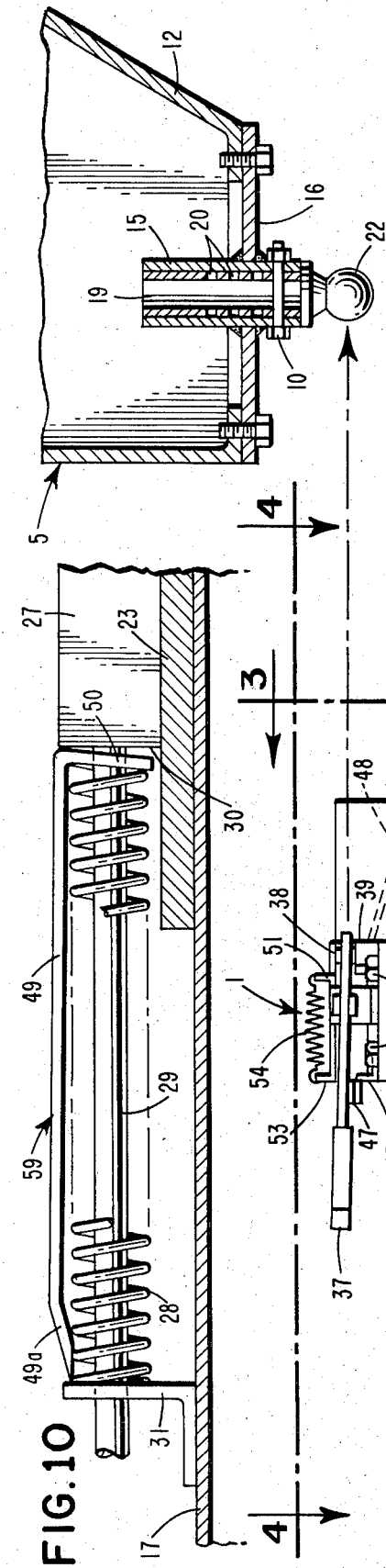
FIG. 10 is a fragmentary side view partly in section of an automatic jaw locking embodiment of the invention.
Figure 3:
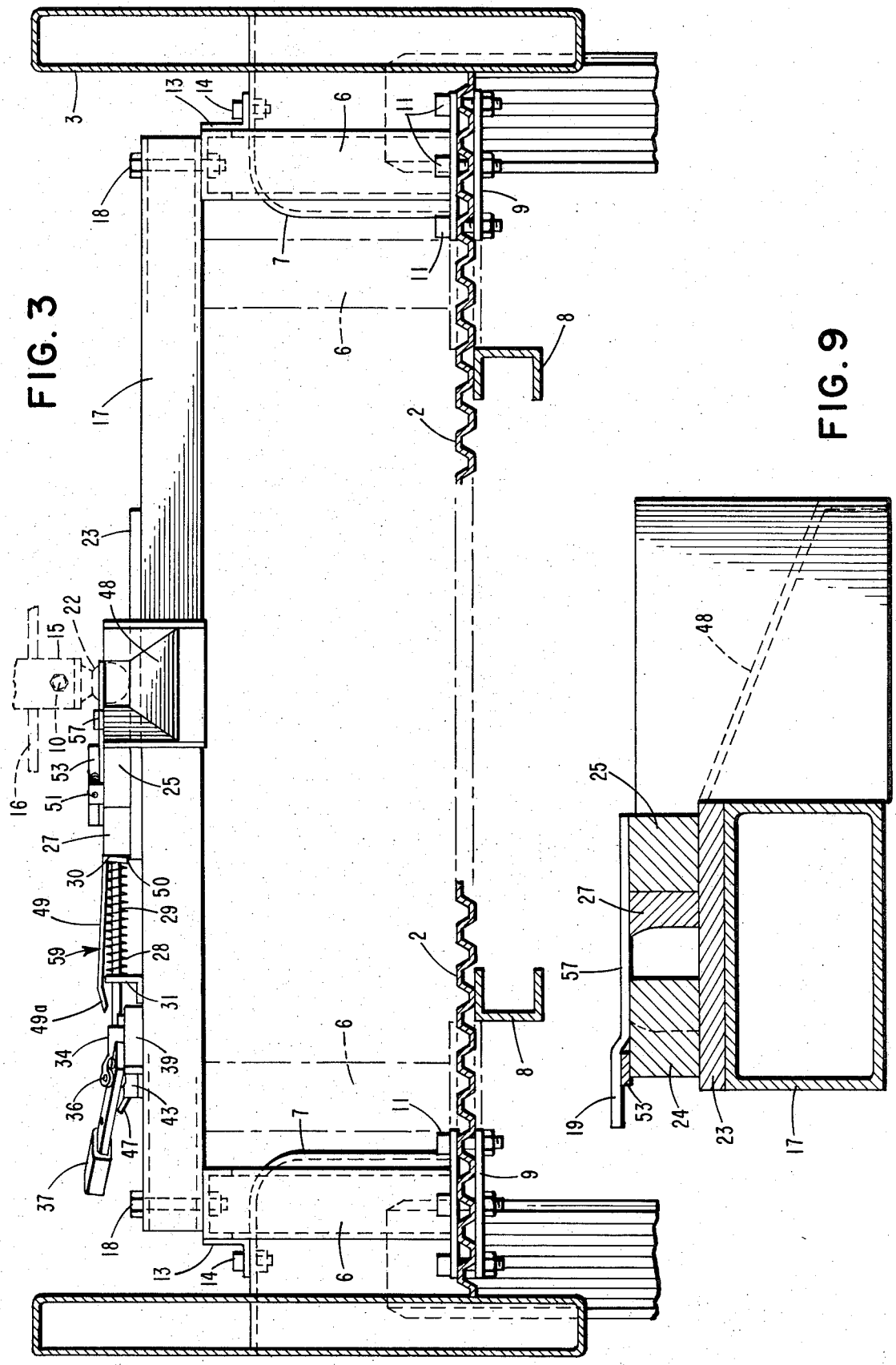
FIG. 3 is a front view partly in section of the hitch of the present invention along the lines 3—3 of FIG. 2.
Figure 4:
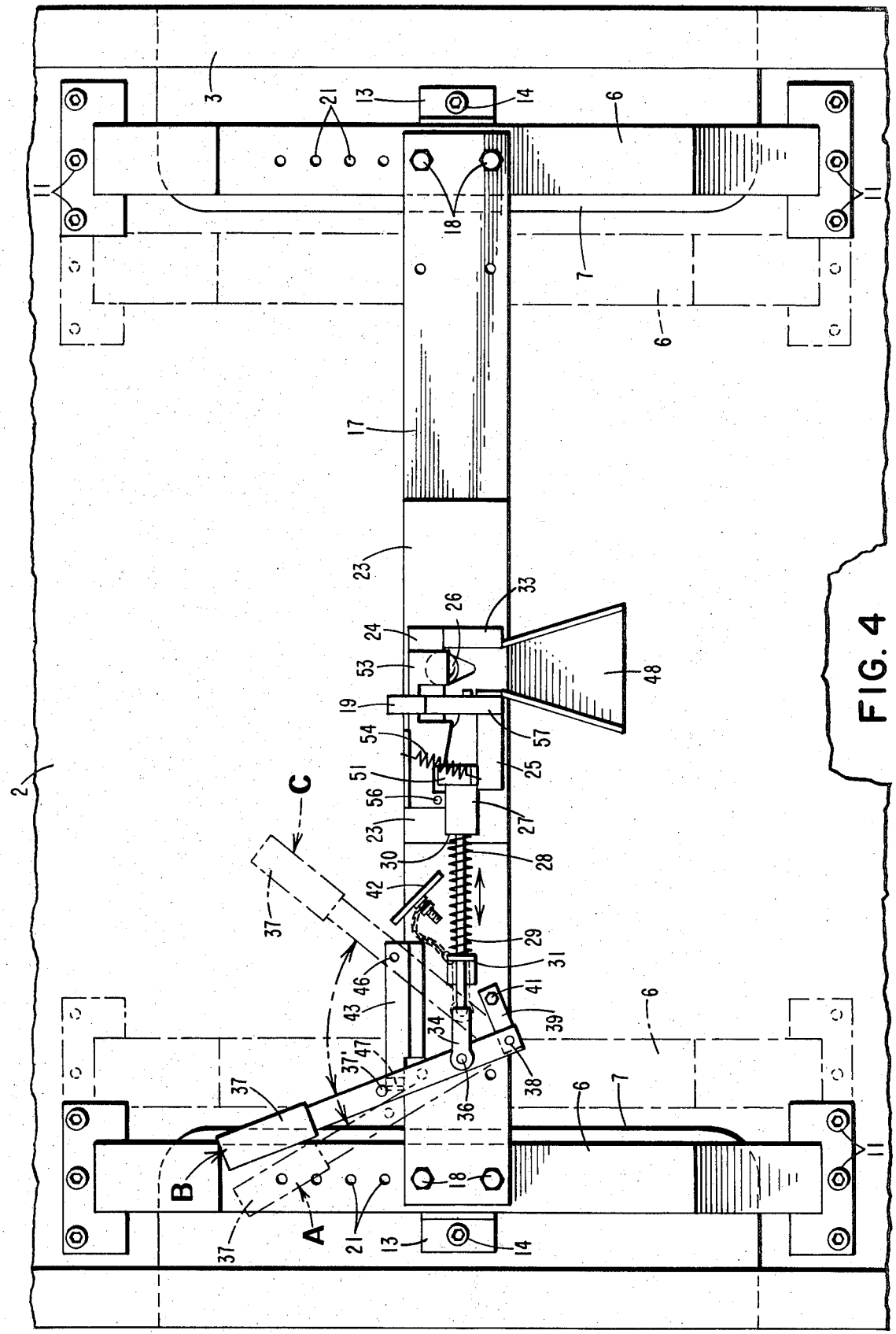
FIG. 4 is a top plan view of the apparatus of the invention taken along the lines 4—4 of FIG. 2.

In the preferred embodiment of the invention illustrated in FIGS. 3, 6, and 10, an automatic jaw locking clip 59 is provided to prevent locking jaw member 27 from opening or becoming unlocked during towing in the event that lock pin 42 is not engaged. The locking clip is omitted in other Figures for the sake of clarity. The automatic jaw locking clip 59 comprises a rigid, longitudinally extending arm 49 substantially the same length as spring member 28 when uncompressed, and a downwardly extending end plate 50 disposed adjacent to the chin 30 of sliding jaw member 27. End plate 50 is integral with arm member 49 and bent at an acute angle with respect thereto. When in the locked position, the free end of arm 49 abuts the face of spring retainer 31 while the downwardly extending end plate 50 abuts the chin of jaw member 27. Spring 28 is compressed against said end plate effectively biasing clip 59 into the locked position and preventing any movement of shaft member 29 to the end that jaw member 27 cannot be opened.

Shaft 29 extends through a hole (not numbered) in end plate 50 holding locking clip 59 in place. The hole in end plate 50 through which shaft 29 extends is of such size as to allow the disengagement of arm 49 from locking abutment with spring retainer 31 by lifting arm 49 above spring retainer 31. In the preferred embodiment and as illustrated in the figures, the free end of arm 49 is angled downwardly at 49a for more effective locking abutment with the face of spring retainer 31.

To operate the hitch of the invention, pin 22 in pin box 12 must be adjusted to the proper level such that when the trailer is hitched it will be level with respect to the road. Commencing from the fully locked state of the hitch illustrated in FIG. 6, locking screw 42 is disengaged from anchor hole 46 and jaw lock clip 59 is disengaged from spring retainer means 31. Handle 37 is then rotated to the left and engaged with friction brake 47 as shown in dot-dash lines at Position A of FIG. 4. Position B of handle 37 is the unbraked position when the mechanism is cocked and ready to receive the trailer hitching ball. Position C is the location of the handle when the mechanism is locked for towing. Leftward rotation of handle 37 pulls rod 29 which in turn unlocks or opens jaw member 27. When jaw member 27 reaches the fully unlocked position detent catch 52 will engage latch bar 51 on jaw member 27. Release of handle 37 from frictional engagement with brake 47 is effected by lifting of the handle which then moves into Position B. The unbraking of handle 37 places trigger 53 in the cocked position. With the hitch in the cocked position the towing vehicle is backed up to the trailer until the trailer pin 22 contacts the surface loading ramp 48 at which time further rearward movement of the towing vehicle will cause pin 22 to push against trigger plate 53 rotating it outwardly releasing latch bar 51 from detent catch 52 at which time compression spring 28 will cause locking jaw 27 to close with great force locking trailer pin 22 securely in place. Simultaneously with the closing of jaw 27, locking clip 59 will automatically fall into abutting contact with spring retainer means 31 preventing opening of the hitch. Locking pin 42 may then be inserted through the pin hole in handle 37 and engaged with anchor hole 46.

It is believed that it will be readily apparent from the foregoing description that the hitch previously described accomplishes the objects as set forth at the outset of the present specification, and it is clear that changes in the size, shape and arrangement of the parts obvious to one of ordinary skill in the art may be made without departing from the spirit and scope of this invention which is only defined and limited in the appended claims.

What is claimed is:

1. A trailer hitch comprising:
   a. a pin means comprising an adjustable pin mounted on the trailer;
   b. means mounted on the towing vehicle defining a seat;
   c. locking means for locking said pin in said seat means, said locking means having one movable jaw and one stationary jaw, said movable jaw being capable of locking by engaging said pin;
   d. spring means urging said locking means into said locked position; and
   e. a trigger means, associated with said seat including a trigger plate, a catch on said trigger plate, and a latch means on said movable jaw which latch means engages said catch when said locking means is unlocked, said catch being released by the pressure of said pin upon the said trigger plate upon introduction of the pin into said seat means.

2. A device as in claim 1 further comprising:
   f. ramp means for guiding said pin into said recess means; and
   g. handle means connected with said movable jaw for moving said jaw to an unlocked position.

3. A device in accordance with claim 1 further comprising:
   h. locking clip means associated with said handle for automatically locking said pin locking means in the locked position.

4. A device as in claim 2 further comprising:
   i. means for securing said handle means in said locked position; and
   j. means for securing said handle means in an unlocked position.

5. A trailer hitch mounted on a flat surface of a pickup truck comprising:
   a. a pair of support means each disposed above the rear wheel wells of the truck and secured to the truck bed thereto;
   b. a crossmember adapted to be adjustably and removably secured to said pair of support means;
   c. hitch means mounted on said crossmember for engaging a pin on a towed vehicle, said hitch means having a seat for said pin;
   d. locking means for locking the pin in said seat, said locking means having one slidable member and one stationary member, said slidable member being capable of assuming both a locked and unlocked position with respect to said stationary member;
   e. spring means biasing said slidable locking member into the locked position;
   f. handle means connected to said slidable locking member for unlocking said member; and
   g. means for securing said handle means in the locked position and means for securing said handle means in the unlocked position.

6. The towing apparatus of claim 5 further comprising:

h. a trigger means comprising a plate means pivotally mounted at one end to said stationary locking member, a catch means in said plate means, a latch means on said slidable locking member engaged with said catch when said locking means is in an unlocked position and cocked, the free end of said trigger plate being disposed over said seat, said catch being released by contact of the pin with said plate means.

7. The locking trigger means of claim 6 having a spring means connected with said trigger plate and said movable jaw biasing said trigger to the cocked position.

8. The towing apparatus of claim 5 further comprising:
   j. automatic locking means connected with said handle means and said spring means for automatically locking said movable jaw into the locked position preventing said handle means from being moved to the unlocked position.

9. A trailer hitch mounted on the bed of a pick-up truck comprising:
   a. a pair of support means adapted to be secured to the truck bed;
   b. a crossmember adapted to be secured to said pair of support means at a plurality of points with respect to the axle of the truck;
   c. a pin means mounted on a trailer, said pin means comprising a support frame mounted on said trailer and a pin member comprising a shaft means adjustably secured to said support frame whereby the length of the pin may be adjusted to effect leveling of the trailer when the trailer is hitched to said truck;
   d. hitch means mounted on said crossmember, said means having a seat thereon for receipt of the pin mounted on the towed vehicle;
   e. jaw means defining said seat in said hitch, said jaw means having one movable member and one stationary member;
   f. spring means mounted between the movable jaw member and a spring retainer mounted on said crossmember biasing the movable jaw member into a closed and locking position with respect to said pin member;
   g. a handle means connected to said movable jaw member for moving said jaw from the closed position to to the open position; and
   h. means connected with said jaw opening handle means adapted to engage with said movable jaw member and said spring retainer member upon closing said movable jaw member whereby said jaw member cannot be opened.

10. The trailer hitch as set forth in claim 9 wherein said pin shaft means is telescopically mounted within said support member.

11. The trailer hitch of claim 10 wherein lock means are provided to hold said pin shaft means in a predetermined position with respect to said support member.

12. The trailer hitch of claim 9 wherein the pair of support members are constructed in such manner as to be mounted over the wheel wells of the pick-up truck and mounted on the bed of the truck.

13. The trailer hitch of claim 9 further comprising:
   i. a trigger means associated with said seat means and said jaw means in such manner that movement of said pin into said seat effects the automatic closing of said movable jaw member about said pin.

14. The device as in claim 1, further comprising:
   k. means for vertically adjusting said pin.

* * * * *